United States Patent
Winocur

(10) Patent No.: US 8,348,029 B2
(45) Date of Patent: Jan. 8, 2013

(54) SINGLE FASTENER STRUT TOP MOUNT AND METHOD OF OPTIMIZING SAME

(75) Inventor: Paul A. Winocur, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1125 days.

(21) Appl. No.: 11/677,070

(22) Filed: Feb. 21, 2007

(65) Prior Publication Data

US 2008/0197552 A1 Aug. 21, 2008

(51) Int. Cl.
*F16F 9/38* (2006.01)
*F16F 9/36* (2006.01)

(52) U.S. Cl. .............. 188/322.12; 267/33; 267/293; 280/124.155

(58) Field of Classification Search ............. 188/322.12; 267/33, 64.11, 64.23, 195, 219, 220, 292, 267/293; 280/124.147, 124.155
See application file for complete search history.

(56) References Cited

U.S. PATENT DOCUMENTS

| | | | | |
|---|---|---|---|---|
| 3,279,832 A | * | 10/1966 | Bergman | 403/51 |
| 3,596,915 A | * | 8/1971 | Snidar | 277/635 |
| 4,747,587 A | | 5/1988 | Ferrel | |
| 5,000,429 A | | 3/1991 | Wittmar et al. | |
| 5,248,134 A | | 9/1993 | Ferguson et al. | |
| 5,454,585 A | | 10/1995 | Dronen et al. | |
| 5,467,971 A | * | 11/1995 | Hurtubise et al. | 267/220 |
| 5,788,262 A | | 8/1998 | Dazy et al. | |
| 6,126,155 A | * | 10/2000 | Smith et al. | 267/220 |
| 6,267,512 B1 | * | 7/2001 | Beghini et al. | 384/609 |
| 6,290,218 B1 | | 9/2001 | Mayerbrock | |
| 6,382,645 B1 | | 5/2002 | Gravelle et al. | |
| 6,736,381 B2 | * | 5/2004 | Chesne | 267/220 |
| 7,032,912 B2 | | 4/2006 | Nicot et al. | |
| 7,077,248 B2 | | 7/2006 | Handke et al. | |
| 7,192,041 B2 | | 3/2007 | Nicot et al. | |
| 8,109,492 B2 | | 2/2012 | Winocur | |
| 2004/0100057 A1 | * | 5/2004 | Nicot et al. | 280/93.5 |
| 2005/0242542 A1 | * | 11/2005 | Handke et al. | 280/124.155 |
| 2006/0125164 A1 | | 6/2006 | Mansueto et al. | |
| 2006/0151928 A1 | | 7/2006 | Tamura | |
| 2007/0144850 A1 | * | 6/2007 | Hattori | 188/322.16 |
| 2007/0267793 A1 | | 11/2007 | Chamousset et al. | |
| 2009/0315292 A1 | | 12/2009 | Winocur | |

FOREIGN PATENT DOCUMENTS

| | | |
|---|---|---|
| DE | 2916294 A1 | 1/1980 |
| DE | 8235995 U1 | 6/1983 |
| FR | 2862116 A1 | 5/2005 |
| GB | 2347906 A | 9/2000 |
| JP | 8-100831 A | 4/1996 |

* cited by examiner

*Primary Examiner* — Melody Burch

(57) ABSTRACT

A strut top mount is optimized to provide a resilient response to jounce and rebound load rates that is symmetrical and linear over a predetermined range of travel. An annular tower is formed of the body structure. A central bracket has adhered thereto an outer resilient element that abuts the tower, and has adhered oppositely thereto an inner resilient element. A bearing is supported by the central bracket, and a spring seat is supported by the bearing. A sleeve is received by a strut shaft and adhered to the inner resilient element A lower washer abuts a lower end of the inner resilient element. An upper washer abuts an upper end of the inner resilient element. A retention washer is mounted onto the strut shaft, wherein a periphery thereof has a retention washer resilient element. The components are collectively tuned to provide the optimization.

10 Claims, 7 Drawing Sheets

SINGLE FASTENER STRUT TOP MOUNT AND METHOD OF OPTIMIZING SAME

TECHNICAL FIELD

The present invention relates to MacPherson strut-type motor vehicle suspension systems, and particularly to single fastener MacPherson strut top mounts.

BACKGROUND OF THE INVENTION

Motor vehicle suspension systems are configured so that the wheels are able to follow elevational changes in the road surface as the vehicle travels therealong. When a rise in the road surface is encountered, the suspension responds in "jounce" in which the wheel is able to move upwardly relative to the frame of the vehicle. On the other hand, when a dip in the road surface is encountered, the suspension responds in "rebound" in which the wheel is able to move downwardly relative to the integrated body/frame structure of the vehicle. In either jounce or rebound, a spring (i.e., coil, leaf, torsion, etc.) is incorporated with the body structure in order to provide a resilient response to the respective vertical movements of the wheel with regard to the vehicle body structure. However, in order to prevent wheel bouncing and excessive vehicle body motion, a shock absorber or strut is placed at the wheel to dampen wheel and body motion. An example of a MacPherson strut is disclosed in U.S. Pat. No. 5,467,971.

Of interest is a prior art single fastener strut top mount for a MacPherson strut which is manufactured by Adam Opel GmbH, a division of General Motors Corporation, Detroit, Mich., and is shown generally at 10 in FIG. 1. This prior art strut top mount 10 interfaces with a broad, annular strut tower 12 which at its lower end (not shown) is connected to the body structure of the motor vehicle. This prior art strut top mount 10 features an annular tapered dome 14 that is open downward nestingly within the tower 12, and is welded thereto at a conjoining 16 (the taper being smallest adjacent the conjoining, and largest distant from the conjoining). An annular outer rubber element 18 has an inclined outer surface 18a which abuts the dome 14. An annular metal insert 20 is preferably provided, for stiffening, within the outer rubber element 18 adjacent the dome 14. An annular stamped metal support shell 22 is adhered to the outer rubber element 18 in nested (i.e., in cross-section being oppositely disposed) relation to the dome 14; and an annular inner rubber element 24 is nested within and adhered to the support shell 22 in cross-section being in opposite disposition with respect to the outer rubber element 18, wherein the aforementioned adherences result from the molding process of the inner and outer rubber elements.

At an annular shelf 22a of the support shell 22, within an upper polymer housing 26c, is an upper race 26a of an annular bearing 26. The lower race 26b of the bearing 26, within a lower polymer housing 26d, is located at an annular spring bracket 28, wherein the upper and lower polymer housings mutually have a conventional labyrinthine seal interfacing, and wherein the spring bracket locates and handles loads from both the coil spring 32 and the jounce bumper 34. At an outer periphery 28a of the spring bracket 28, wherein the spring bracket has a diameter less than that of the strut tower 12, but exceeding the diameter of the dome 14, is formed a spring seat 30 having a rubber insulator 30a upon which abuts the coil spring 32. At an inner periphery 28b of the spring bracket 28, adjacent the bearing 26, is a connection 28c to the jounce bumper 34. A strut shaft 36 is reciprocally interfaced to a strut housing (not shown) in a conventional manner so as to provide damping as it reciprocates in relation thereto in response to jounce and rebound. A tubular metal sleeve 35 receives the strut shaft 36 at a shoulder 36a thereof, wherein the sleeve is adhered (as a result of the aformentioned molding process) to the inner rubber element 24. At the shoulder 36a of the strut shaft 36 is a lower washer 38 which abuts a lower end 24a of the inner rubber element 24 and a lower end of the sleeve 35. Abutting an upper end of the sleeve 35 is an upper washer 40 which also abuts an upper end 24b of the inner rubber element 24, wherein the upper washer is held in place by a first nut 42 that is threaded onto the strut shaft 36. A retention washer 44 is mounted onto the strut shaft 36, and is held in place between the first nut and a second nut 46, which is also threaded onto the strut shaft. At the periphery of the retention washer 44 is a retention washer rubber element 48.

FIGS. 1A and 1B are graphs showing what is believed to be the response of the prior art strut top mount 10 to jounce and rebound. In this regard, FIG. 1A shows a graph 50 of load force versus displacement in which plot 52 indicates the believed response of the outer rubber element 18 to jounce; and FIG. 1B shows a graph 60 of load force versus displacement in which plot 62 indicates the believed response of the prior art strut top mount 10 to jounce and rebound.

From FIGS. 1A and 1B, several conclusions can be drawn with respect to the prior art strut top mount 10. Asymmetry is seen in the jounce to rebound rate ratio. Over-travel of the prior art strut top mount 10 can occur if the jounce bumper forces are routed through the inner rubber element, wherein the prior art strut top mount would have an unacceptably large amount of travel in jounce; and is likely why the jounce bumper forces are instead routed through the spring loadpath. The latter loadpath arrangement does not enable use of monotube struts (monotube struts route the jounce bumper loads up through the strut rod and, therefore, the strut top mount thereof requires an appropriately high load capacity in the damper rod load-path to handle them, whereby this is possible only for a single path strut top mount or a dual path strut top mount with the bumper and damper loads combined into the same path). The rebound rate changes abruptly as the retention washer rubber element engages the strut tower. The outer rubber element axial rate cannot be used to tune the prior art strut top mount 10 axial rate range, and the inner rubber element has little authority over overall axial rate, wherein the outer rubber element axial rate is determined by the inherent deflection requirement for retention (the retention objective is to ensure that the prior art strut top mount maintains contact with the underside of the strut tower at all times, and the outer rubber element compliancy allows for the retention washer to separate from the strut tower and thereby create freedom of mount movement during operation). With respect to the radial rate range of the prior art strut top mount 10, the large outer rubber element acts in series with the inner rubber element and is relatively soft in the radial direction. Additionally, the design height position of the prior art strut top mount 10, when loaded under vehicle curb weight, varies with vehicle mass, making it difficult to use this design on multiple vehicle applications (i.e., differing rubber chemistry or durometer of each of the inner and outer rubber elements is required, wherein the outer rubber element is adjusted to vehicle mass to provide a desired retention washer gap with respect to the strut tower, and the inner rubber element is tuned to adjust, somewhat, the mount rate).

Accordingly, what remains needed in the art is a single fastener, compact strut top mount which has an optimized resilient response to jounce and rebound.

SUMMARY OF THE INVENTION

The present invention is a single fastener, compact strut top mount which is optimized in that its resilient response to jounce and rebound load rates is symmetrical and linear over a predetermined range of travel, is stiff radially, is tunable for various vehicle applications and provides excellent vibration isolation.

The strut top mount according to the present invention is configured to interface with a narrow, annular strut tower which, at its lower end, is connected to the body structure of the motor vehicle. The strut top mount includes an annular central bracket. At one side of the central bracket, is an annular outer resilient element, and at the other side of the central bracket is an annular inner resilient element, wherein the inner and outer resilient elements are adhered to the central bracket as a result of the molding process of the inner and outer resilient elements. The outer resilient element abuts the strut tower without adherence thereto. A series of ramp-shaped convolutes are integrally formed at the outer peripheral side and top surfaces of the outer resilient element.

One (upper) side of a bearing is located at the central bracket, and a spring seat is located at the other (lower) side of the bearing, wherein the bearing and the spring seat are generally in vertical alignment with each other. A metal sleeve receives a strut shaft, wherein the sleeve is adhered to the inner resilient element (as a result of the aforementioned molding process). A lower washer abuts a lower end of the inner resilient element and a lower end of the sleeve. At an upper end of the sleeve is an upper rate washer which abuts an upper end of the inner resilient element, wherein the upper rate washer is held in place by a first nut that is threaded onto the strut shaft. A retention washer is mounted onto the strut shaft, and is held in place between the first nut and a second nut which is also threaded onto the strut shaft. At the periphery of the retention washer is a retention washer resilient element. The preferred resilient material of the inner and outer resilient elements and the retention washer resilient element is rubber.

In operation of the strut top mount according to the present invention, during jounce and rebound the outer and inner resilient elements stretch or compress, while the top convolute portion of the convolutes is rollingly interfaced with the tower (see below). The inner resilient element is primarily tuned to provide effective vibration isolation simultaneous with damper load reaction, while the outer resilient element provides additional isolation, and axial retention and load reaction while maintaining high radial stiffness. The configuration of the components and the composition of the outer and inner resilient elements are collectively tuned according to the method of the present invention to provide a symmetrical response of the strut top mount to jounce and rebound with a linear rate over a range of jounce and rebound motion. At the extreme of jounce, the central bracket provides an exponentially increasing reaction force of the outer resilient element against the strut tower. At the extreme of rebound motion, the retention washer resilient element abuts the tower with a high order exponential reaction force/deflection characteristic so as to keep mount travel within desired limits of rebound.

The method of optimizing the strut top mount according to the present invention encompasses the opposing objectives that exist for the axial load rates of the outer resilient element. A very soft axial load rate is needed to allow a gap to form between the retention washer and the vehicle body structure at the strut tower as vehicle weight is applied to the strut top mount, yet a very high axial load rate is needed to allow damper forces to be effectively reacted to the vehicle body structure. These objectives are simultaneously achieved by giving the outer resilient element an axial force deflection curve with a low rate over small deflections and thereafter a high order (fourth degree or higher) exponential shape.

A soft initial load rate characteristic of the outer resilient element provides a desirable strut top mount displacement when the vehicle corner sprung weight is applied to the strut top mount. A high load rate in the steep portion of the force deflection curve offers favorable damper reaction to the vehicle body. Because the outer and inner resilient elements react in series to loads applied to the strut top mount by the strut shaft, the axial compliance contribution from the outer resilient element is minimized to make the resultant axial load rate of the strut top mount from the outer and inner resilient elements sufficiently high. This is achieved by ensuring that the outer resilient element of the strut top mount is loaded into the steep portion of its force deflection curve under the vehicle's curb weight.

A specific arrangement of the strut tower and outer resilient element enable this desired load rate shape. The outer resilient element has a nearly vertical section positioned within a corresponding nearly vertical tower side wall. The column of resilient material thereof acts primarily in shear to axially applied forces and provides the low initial load rate, while reacting mostly in compression to radially applied forces for high radial stiffness. A top section of the outer resilient element located adjoining the substantially horizontal tower top wall reacts vertically against the tower with a rolling action and is ultimately mostly in compression for high durability and high load rate.

The top convolute portion of the convolutes provide a rolling engagement with the tower top wall, and at outer periphery of the outer resilient element acts primarily in shear to axially applied forces and provides a low initial load rate, while reacting mostly in compression to radially applied forces with respect to the tower side wall. This engagement feature provides a smooth, continuous transition between the soft shear and stiff compression sections of the outer resilient element and eliminates potential slapping noises by avoiding intermittent contact between flat surfaces. This outer resilient element geometric arrangement also enables a high radial load rate that adduces a favorable vehicle steering feel.

Several advantages of the strut top mount according to the present invention include: contact between the outer resilient element and the underside of the strut tower is provided between the extremes of jounce and rebound, thereby eliminating noise and providing high durability; a large gap between the retention washer and the strut tower of the vehicle body structure provides unimpeded damper isolation and sufficient freedom from contact with the strut tower during coning motion of the strut top mount during steering action of the vehicle suspension; a sufficiently high strut top mount axial rate for effective damper reaction (an overly high axial rate is undesirable for vibration isolation); and a high strut top mount radial rate for favorable vehicle steering feel. Further, since the strut top mount according to the present invention is quite insensitive to vehicle mass, it is suitable for use on a range of vehicle applications having differing vehicular masses.

Accordingly, it is an object of the present invention to provide a single fastener, compact strut top mount which has an optimized resilient response to jounce and rebound.

This and additional objects, features and advantages of the present invention will become clearer from the following specification of a preferred embodiment.

DESCRIPTION OF THE PREFERRED EMBODIMENT

Figure 10:
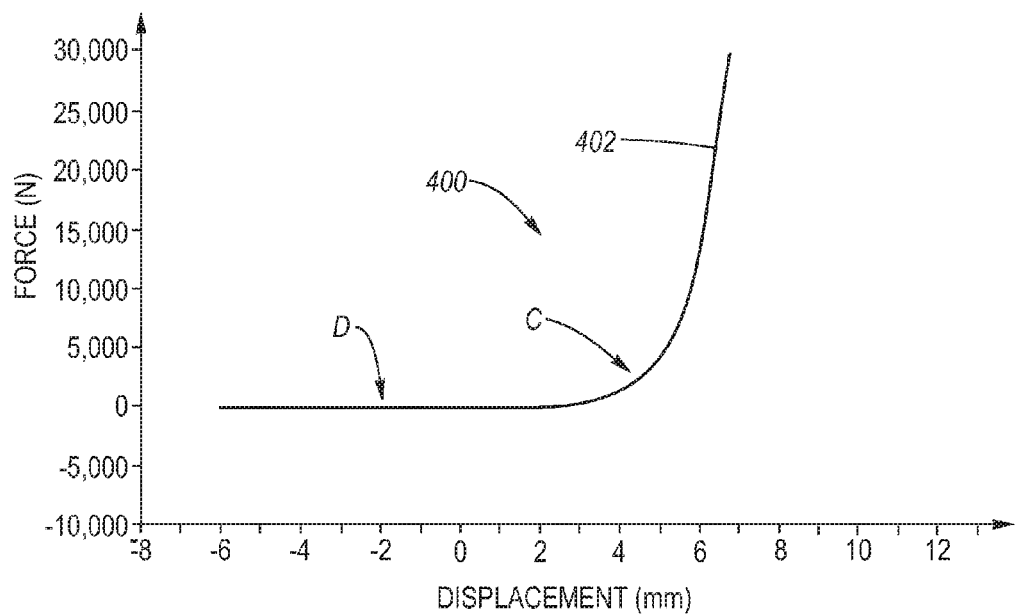
FIG. 10 is a graph of displacement versus load force of an outer resilient element of the strut top mount of FIG. 2 pursuant to the optimizing method according to the present invention.
Figure 11:
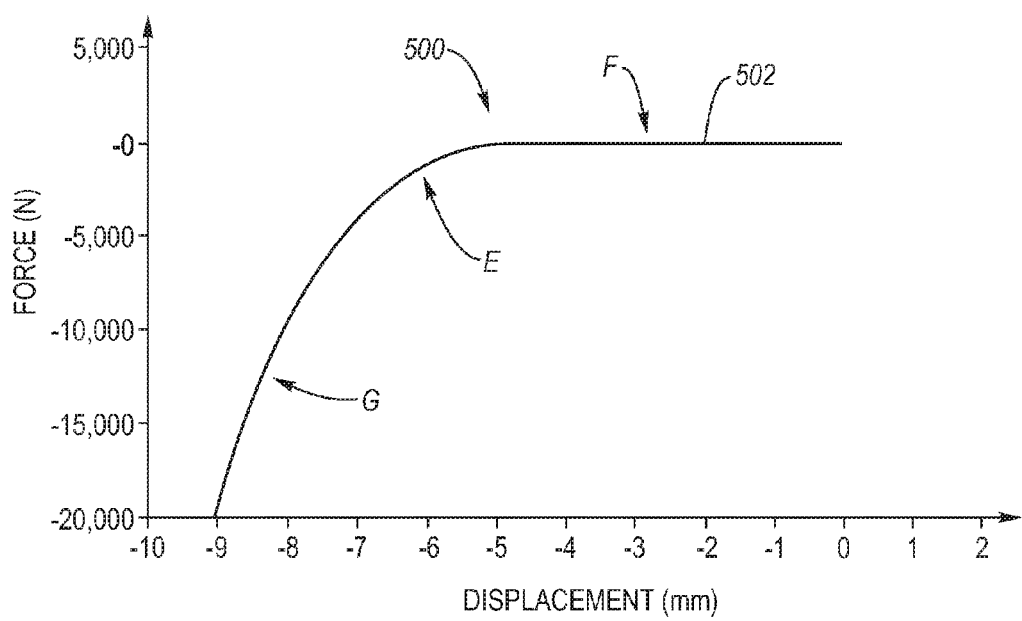
FIG. 11 is a graph of displacement versus load force of a retention washer resilient element of the strut top mount of FIG. 2 pursuant to the optimizing method according to the present invention.
Figure 12:
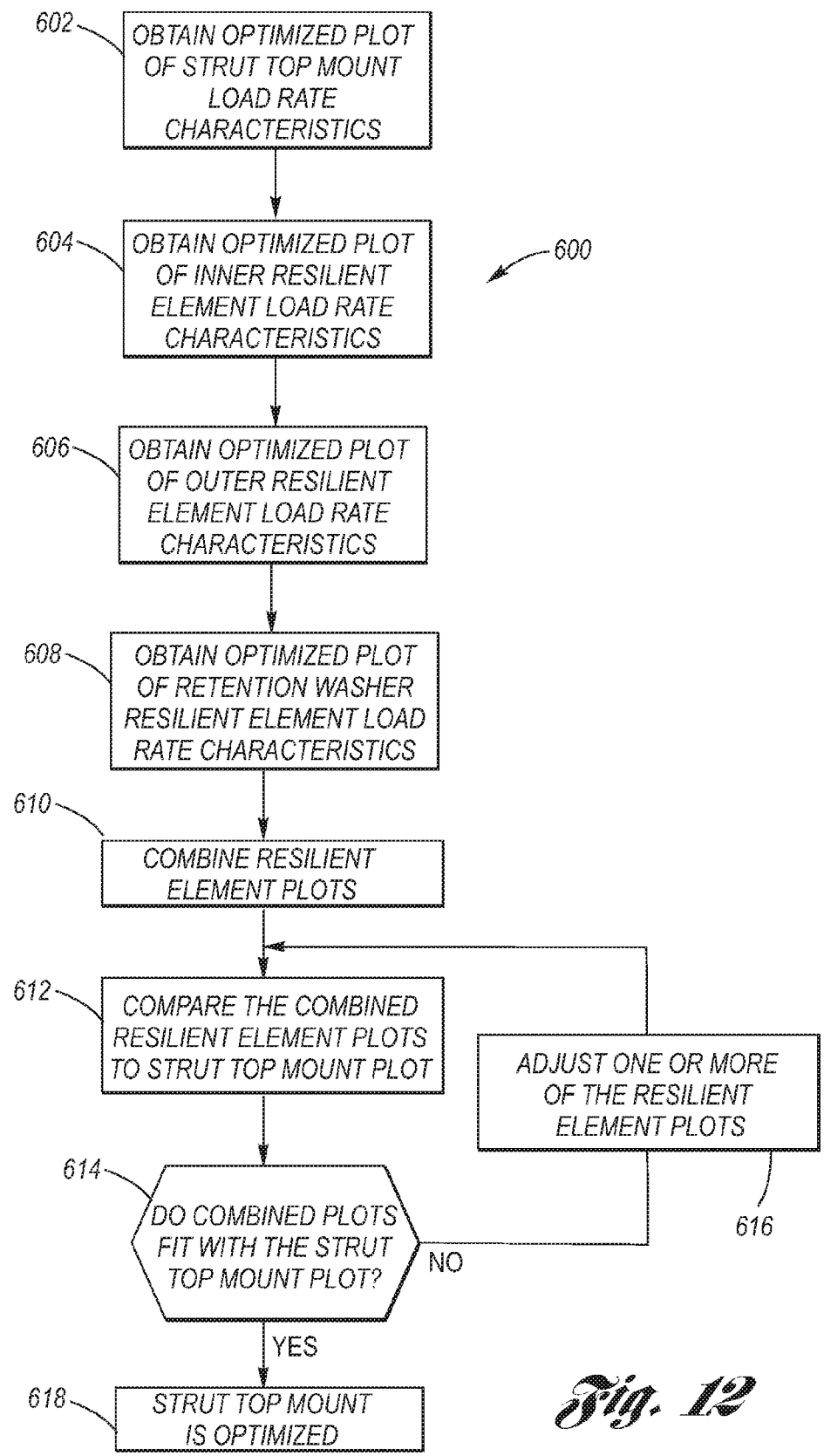
FIG. 12 is a flow chart depicting steps for carrying-out strut top mount optimization according to the present invention.

Referring now to the Drawing, FIGS. 2 through 6 depict views of the strut top mount according to the present invention, FIGS. 7 through 11 depict graphs used, according to the present invention, for optimizing the strut top mount according to the present invention, the method for which being summarized at FIG. 12.

Figure 2:
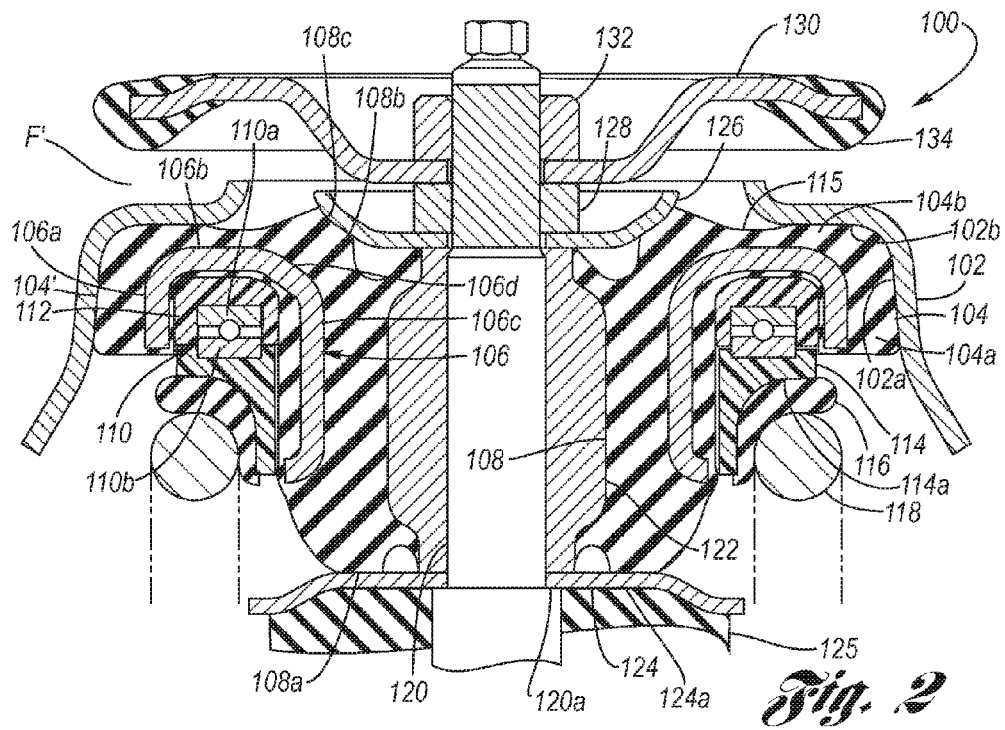
FIG. 2 is a partly sectional side view of a strut top mount according to the present invention, shown at a neutral position (ie., subjected to curb weight).
Figure 3:
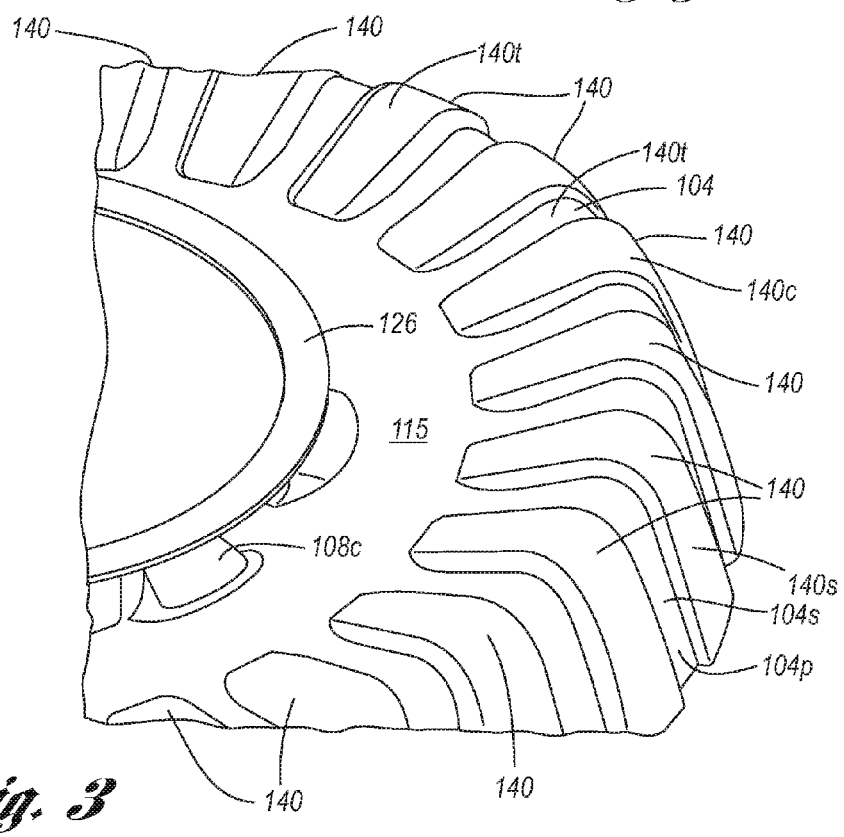
FIG. 3 is a broken-away perspective view of an outer resilient element of the strut top mount of FIG. 2.
Figure 4:
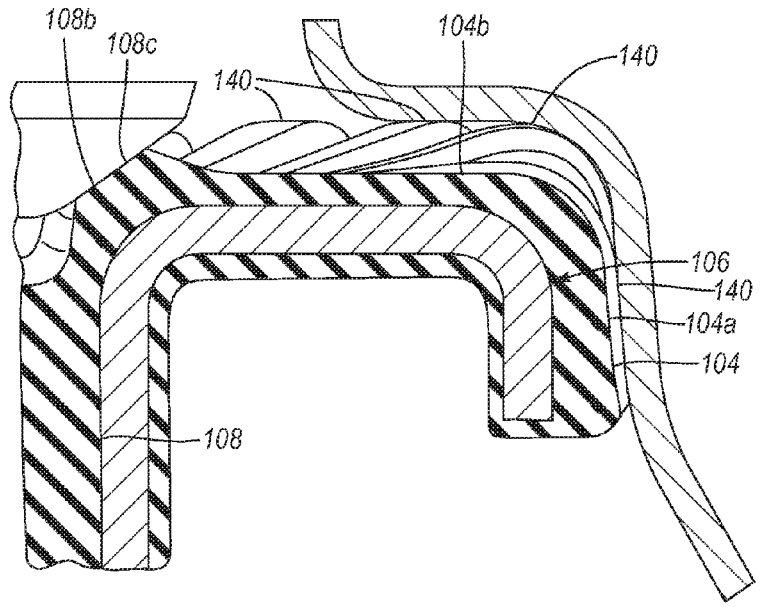
FIG. 4 is a broken-away, detailed sectional view of the strut top mount of FIG. 2.

Referring firstly to FIGS. 2 through 4 structural and functional aspects of the strut top mount 100 according to the present invention will be detailed.

Figure 1:
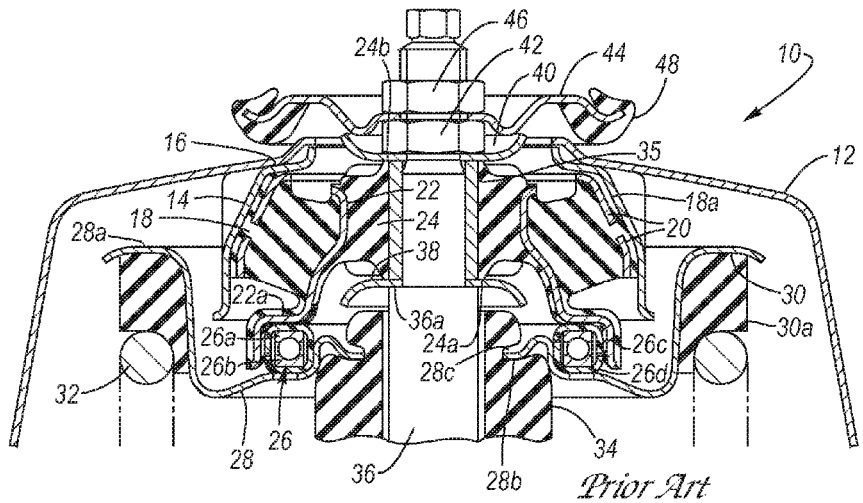
FIG. 1 is a partly sectional side view of a prior art strut top mount.
Figure 1A:
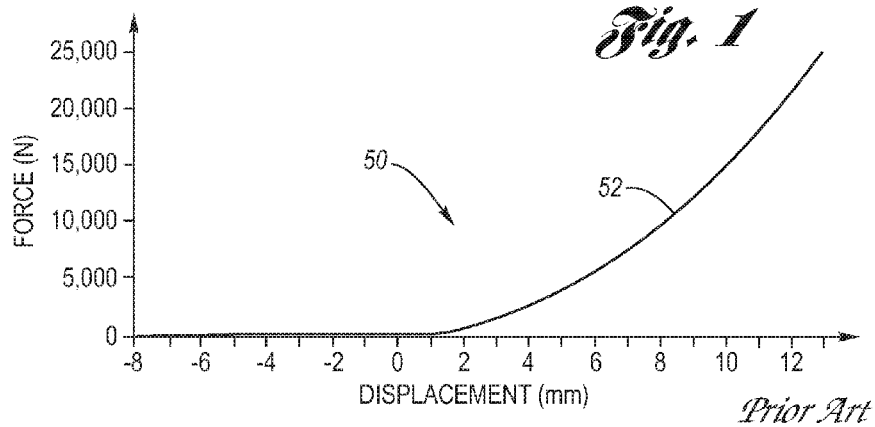
FIG. 1A is a graph of believed displacement versus load force of an outer rubber element of the strut top mount of FIG. 1.
Figure 1B:
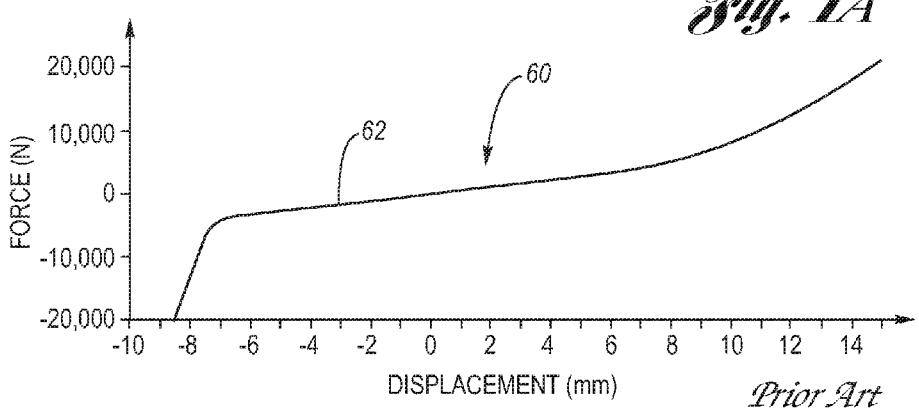
FIG. 1B is a graph of believed displacement versus load force of the strut top mount of FIG. 1.

A narrow, annular strut tower 102 is connected at its lower end (not shown) to structural members of the motor vehicle in a manner that is well known in the art. An annular outer resilient element 104 has a gently inclined outer surface 104' which abuts (without adherence) the strut tower 102 at a tower side wall 102a. The outer resilient element 104 preferably has no metal insert (generally akin to 20 in FIG. 1), but this may be optionally included. An annular central bracket, having a U-shape in cross-section, 106 is defined by an outer bracket wall 106a, a top bracket wall 106b and an inner bracket wall 106c. A series of mutually spaced stiffening darts 106d may be provided in the central bracket 106 for strengthening. The outer bracket wall 106a is adhered to the outer resilient element 104 as a result of the molding process of the outer resilient element. An annular inner resilient element 108 is adhered to the inner wall 106c of the central bracket 106 as a result of the molding process of the inner resilient element. It is preferred for purposes of ease of manufacturing to form (mold) the inner and outer resilient elements 108, 104 as a single piece, mutually interconnected by an upper resilient element 115.

An annular bearing 110 has its upper race 110a seated in an upper bearing polymer housing 112 that is, itself, nested at the top bracket wall 106b. The lower race 110b of the bearing 110 is seated in a lower bearing polymer housing 114, having, in opposing disposition with respect to the lower race, a spring seat 114a therebelow. It is to be noted that while not specifically illustrated in the drawing for the sake of clarity, the upper and lower bearing polymer housings 112, 114 are mutually sealed by a conventional labyrinthine interface. A rubber coil spring insulator 116 is disposed at the spring seat 114a, wherein a coil spring 118 is seated thereat. A strut shaft 120 is reciprocally interfaced in a conventional manner to a conventional strut housing (not shown) to provide wheel damping as it reciprocates in relation thereto in response to jounce and rebound.

A metal barrel sleeve 122 having a barrel shape selected to provide a desired radial stiffness, receives the strut shaft 120 at a shoulder 120a thereof, wherein the barrel sleeve is adhered to the inner resilient element 108 as a result of the molding process of the inner resilient element. At the shoulder 120a of the strut shaft 120 is a lower washer 124 which abuts a lower end 108a of the inner resilient element 108 and a lower end of the barrel sleeve 122, and serves two purposes: firstly, transmission of loads into the lower portion of the inner resilient element, and secondly, a jounce bumper cup 124a for location of a jounce bumper 125. At an upper end of the barrel sleeve 122 is an upper rate washer 126 which abuts an upper end 108b of the inner resilient element 108, wherein the upper end is preferably in the form of a plurality of upstanding nibs 108c. The upper rate washer 126 is held in place by a first nut 128 that is threaded onto the strut shaft 120. A retention washer 130 is mounted onto the strut shaft 120, and is held in place between the first nut and a second nut 132 that is threaded onto the strut shaft. At the periphery of the retention washer 130 is a retention washer resilient element 134. The preferred resilient material of the inner and outer resilient elements and the retention washer resilient element is rubber.

The outer resilient element 104 has a vertical column 104a which abuts (without adherence) the tower side wall 102a, wherein the tower side wall is nearly vertical. The vertical column 104a acts primarily in shear to axially applied forces and provides a low initial load rate, while reacting mostly in compression to radially applied forces. A top section 104b of the outer resilient element 104 abuts (without adherence) a tower top wall 102b of the tower 102, wherein the tower top wall is generally horizontal and the top section 104b reacts vertically against the tower top wall almost purely in compression for high durability and high load rate.

As best be seen at FIGS. 3 and 4, a plurality of ramp-shaped convolutes 140 are integrally formed of the outer resilient element 104, wherein a top convolute portion 140t (including the corner 140c) is located at the outer element top 104t, and a side convolute portion 140s (excluding the corner 140c) is located at the outer element peripheral side 104s. In this regard, the side convolute portion 140s allows for manufacturing tolerances of the outer resilient element 104 with respect to the strut tower 102, allowing the strut top mount (particularly the outer resilient element thereof) to be inserted with an interference fit into the strut tower using just a low insertion force. The top convolute portion 140t of the convolutes 140 provide a rolling engagement with the tower top wall 102b, and the outer periphery 104p of the outer resilient element 104 acts primarily in shear to axially applied forces and provides a low initial load rate, while reacting mostly in compression to radially applied forces with respect to the tower side wall 102a. This engagement feature provides a smooth, continuous transition between the soft shear and stiff compression sections of the outer resilient element 104 and eliminates potential slapping noises by avoiding intermittent contact between flat surfaces. This geometric arrangement of the outer resilient element 104, wherein the high radial rate is related to minimal thickness sheer wall and the steepness thereof, also enables a high radial load rate that adduces a favorable vehicle steering feel.

Figure 5:
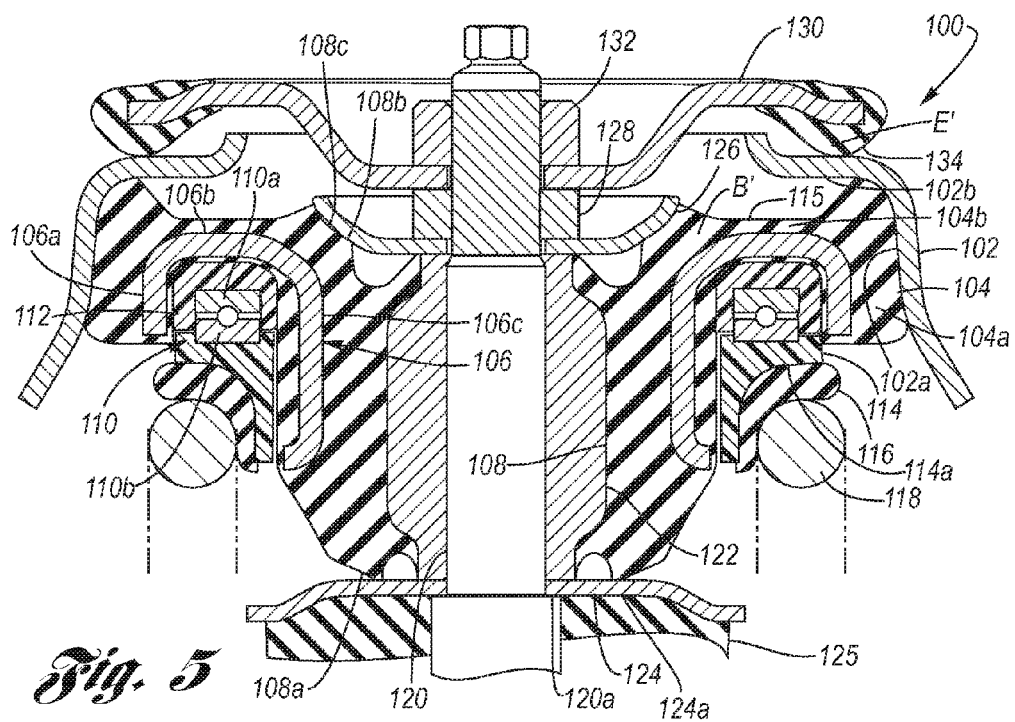
FIG. 5 is a partly sectional view of the strut top mount of FIG. 2, shown at an extreme rebound position.
Figure 6:
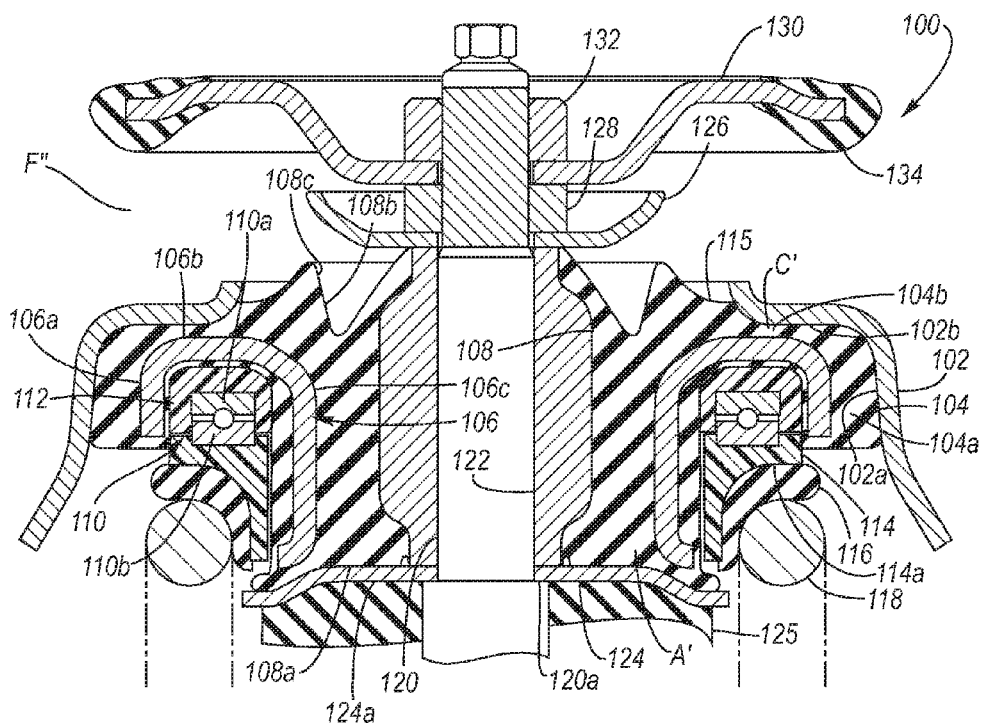
FIG. 6 is a partly sectional view of the strut top mount of FIG. 2, shown at an extreme jounce position.

Referring now additionally to FIGS. 5 and 6, operation of the strut top mount 100 will be detailed.

During jounce and rebound the inner and outer resilient elements 108, 104 stretch or compress, while the top convolute portion 140t of the convolutes 140 is rollingly interfaced with the tower 102. The inner resilient element 108 is primarily tuned to provide effective vibration isolation simultaneous with damper load reaction, while the outer resilient element 104 provides additional isolation, and axial retention and load reaction while maintaining high radial stiffness. The configuration of the components and the composition of the outer and inner resilient elements are collectively tuned according to the method of the present invention to provide a symmetrical response of the strut top mount 100 to jounce and rebound with a linear rate over a selected range of jounce and rebound motion. At the extreme of rebound motion, as depicted at FIG. 5, the retention washer resilient element 134 abuts the tower 102 with a high order exponential reaction force/deflection characteristic so as to keep mount travel within desired limits of rebound. At the extreme of jounce, as depicted at FIG. 6, the central bracket 106 provides an exponentially increasing reaction force of the outer resilient element 104 against the strut tower 102.

Turning attention now to FIGS. 7 through 12, the method of optimizing the strut top mount 100 will be detailed, wherein the method encompasses the opposing objectives that exist for the axial load rates of the outer resilient element. A very soft axial load rate is needed to allow a gap to form between the retention washer and the strut tower of the vehicle body structure as vehicle weight is applied to the strut top mount, yet a very high axial load rate is needed to allow damper forces to be effectively reacted to the vehicle body. These objectives can be accomplished by giving the outer resilient element an axial force deflection curve with a high order (fourth degree or higher) exponential shape.

A soft initial load rate characteristic of the inner and outer resilient elements provides a desirable strut top mount displacement when the vehicle corner sprung weight is applied to the strut top mount. A high load rate in the steep portion of the force deflection curve (see FIG. 10) offers favorable damper reaction to the vehicle body. Because the outer and inner resilient elements react in series to loads applied to the strut top mount by the strut shaft, the axial compliance contribution from the outer resilient element is minimized to make the resultant axial load rate of the strut top mount from the outer and inner resilient elements sufficiently high. This is achieved by ensuring that the outer resilient element of the strut top mount is loaded into the steep portion of the force deflection curve under the vehicle's curb weight, per FIG. 10 (soft initially, then a high order curve which provides high stiffness at the loaded condition).

According to the method of the present invention, per the flow chart 600 depicted at FIG. 12, a series of plots are prepared, selectively combined, compared and adjusted, if necessary, to synergistically achieve a desired optimization of the strut top mount 100.

Figure 7:
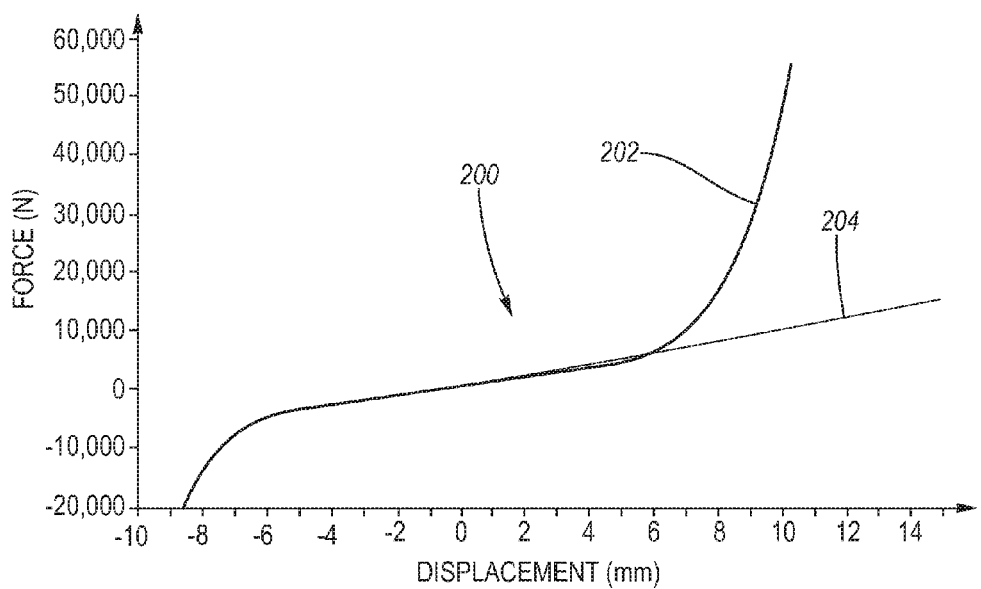
FIG. 7 is a graph of displacement versus load force of the strut top mount of FIG. 2 pursuant to the optimizing method according to the present invention.

At Block 602 a plot of the desired load rate characteristics of the strut top mount 100 is prepared by computer modeling, testing or other empirical methodology. For example, FIG. 7 is a graph 200 of displacement versus load force of the strut top mount 100, having a desired symmetric response to jounce and rebound load rates, as represented by plot 202, wherein a reference plot 204 provides a 1.25 multiplied linear comparison. In this regard, where, for example a 6 mm linear range in each direction is desired, a linear interpolation over the first 2 mm of travel in each direction is provided. This interpolation is then multiplied by 1.25, plotted and extended out to where it intersects the rate curve. The displacement at this intersection is defined as the range of linear rate characteristic for the given curve.

Figure 8:
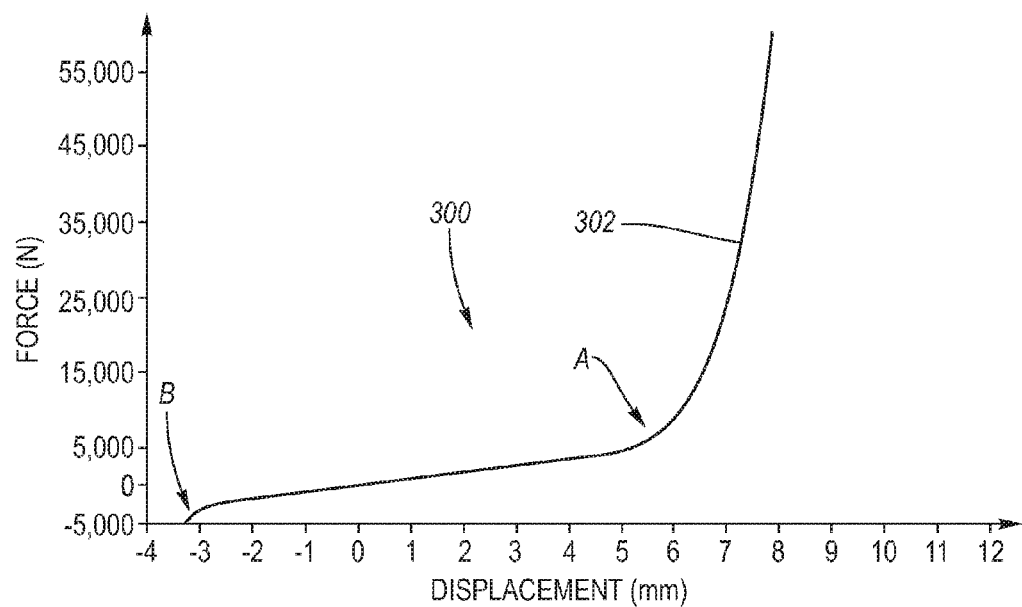
FIG. 8 is a graph of displacement versus load force of an inner resilient element of the strut top mount of FIG. 2 pursuant to the optimizing method according to the present invention.
Figure 9:
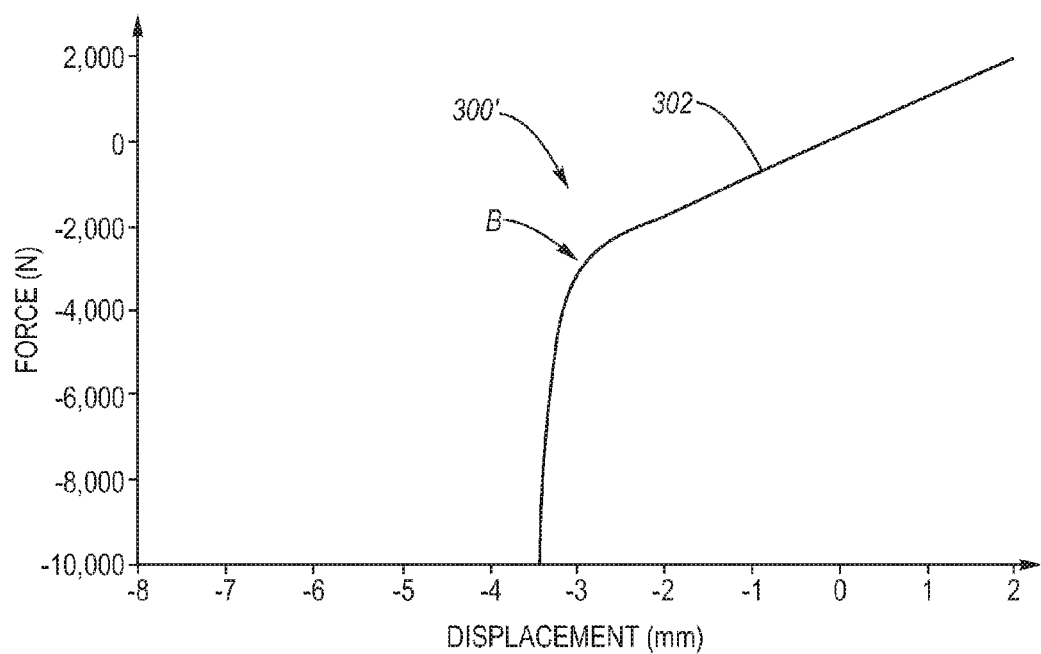
FIG. 9 is a detail portion of the graph of displacement versus load force of the inner resilient element of the strut top mount of FIG. 2 pursuant to the optimizing method according to the present invention.

At Block 604 a plot of the desired load rate characteristics of the inner resilient element 108 is prepared by computer modeling, testing or other empirical methodology. For example, FIGS. 8 and 9 are graphs 300, 300' of displacement versus load force for the inner resilient element 108 of the strut top mount 100. In order to optimize the inner resilient element 108 synergistically with respect to the remainder of the strut top mount 100, the configuration and the composition (i.e., hardness of rubber) are selected in order to provide plot 302, wherein FIG. 8 depicts jounce and FIG. 9 depicts rebound. At region A of plot 302, compression is occurring at region A' of FIG. 6 during jounce, causing a distinct increase in load rate for higher displacements. At region B of plot 302, compression is occurring at region B' of FIG. 5 during rebound, causing a distinct increase in load rate for higher displacements.

At Block 606 a plot of the desired load rate characteristics of the outer resilient element 104 is prepared by computer modeling, testing or other empirical methodology. For example, FIG. 10 is a graph 400 of displacement versus load force of an outer resilient element 104 of the strut top mount 100. In order to optimize the outer resilient element 104 synergistically with respect to the remainder of the strut top mount 100, the configuration and the composition (i.e., hardness of rubber) are selected in order to provide plot 402. At region C of plot 402, compression is occurring at region C' of FIG. 6 during jounce, causing a distinct increase in load rate for higher displacements. At region D, the response to displacement is linear.

At Block 608 a plot of the desired load rate characteristics of the retention washer element 134 is prepared by computer modeling, testing or other empirical methodology. For example, FIG. 11 is a graph 500 of displacement versus load force of a retention washer resilient element 134 of the strut top mount 100. In order to optimize the retention washer resilient element 134 synergistically with respect to the remainder of the strut top mount 100, the configuration and the composition (i.e., hardness of rubber) are selected in order to provide plot 502. At region E of plot 502, compression is occurring at region E' of FIG. 5 during rebound, causing a distinct increase in load rate for higher displacements in region G. At region F, the response to displacement is linear as there is a gap (see F' in FIG. 2 and F'' in FIG. 5).

At Block 610 the plots 302, 402 and 502 are combined. At Block 612 the combined plots 302, 402, 502 are fitted to the optimal plot 202 for the strut top mount 100. At decision Block 614, inquiry is made whether the fit has been established. If the answer to the inquiry is no, then at Block 616 one or more of the resilient element plots 302, 402, 502 is adjusted, whereupon the combination, comparison and inquiry steps are repeated. If the answer to the inquiry is yes, then at Block 618 an optimized strut top mount has been designed and the plot parameters are used to fabricate the components of the strut top mount.

Several advantages of the strut top mount according to the present invention include: contact between the outer resilient element and the underside of the strut tower is provided between the extremes of jounce and rebound, thereby eliminating noise and providing high durability; a large gap between the retention washer and the strut tower of the vehicle body structure provides unimpeded damper isolation and sufficient freedom from contact with the strut tower during coning motion of the strut top mount during steering action of the vehicle suspension; a sufficiently high strut top mount axial rate for effective damper reaction (an overly high axial rate is undesirable for isolation); and a high strut top mount radial rate for favorable steering feel. Further, since the strut top mount according to the present invention is quite insensitive to vehicle mass, it is suitable for use on a range of vehicle applications having differing vehicular masses.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An optimized strut top mount and body structure of a motor vehicle, comprising:
   a strut shaft;
   an annular tower having a tower side wall oriented substantially parallel to a vertical, said annular tower further having a tower top wall, wherein said tower top wall is annularly disposed between said strut shaft and said tower side wall;
   an annular outer resilient element comprising a column and a top section, wherein said column adjoins said tower side wall and said top section adjoins said tower top wall;
   an annular inner resilient element;
   an annular central bracket having a generally U-shaped cross-section, said central bracket comprising an inner bracket wall, an outer bracket wall and a top bracket wall disposed between said inner and outer bracket walls, wherein said outer resilient element is adhered to said outer bracket wall, and wherein said inner resilient element is adhered to said inner bracket wall;
   an annular bearing interconnected with said top bracket wall of said central bracket, said bearing being generally centrally disposed in substantially equidistant relation with respect to said inner bracket wall, said top bracket wall and said outer bracket wall;
   a spring seat interconnected with said bearing, wherein said top bracket wall, said bearing and said spring seat are all substantially aligned with respect to each other and are all disposed within said tower;
   a sleeve adhered to said inner resilient element, wherein said sleeve is in receiving relation to said strut shaft;
   a lower washer affixed to said strut shaft, said lower washer abutting a lower end of said inner resilient element and a lower end of said sleeve;
   an upper rate washer affixed to said strut shaft, said upper rate washer having a cup shape defining an outer washer wall that is acutely angled with respect to said strut shaft, said outer washer wall of said upper rate washer abutting an upper end of said inner resilient element and an upper end of said sleeve;
   a retention washer affixed to said strut shaft substantially adjacent said upper rate washer, said retention washer having a periphery in vertical alignment with said top wall of said tower; and
   a retention washer resilient element adhered to said periphery of said retention washer, wherein said tower top wall is vertically aligned with respect to said retention washer resilient element so as to be abuttable therewith;
   wherein said outer resilient element further comprises a plurality of ramp shaped convolutes integrally formed of said top section and said column, said ramp shaped convolutes being annularly disposed in evenly distributed relation with respect to said top section and said column, said plurality of convolutes abutting said tower top wall and said tower side wall; and wherein said plurality of convolutes rollingly abut said tower top wall.

2. The strut top mount of claim 1, wherein said inner resilient element further comprises a plurality of upstanding nibs, said upper end of said inner resilient element abutting said upper rate washer at said plurality of upstanding nibs.

3. The strut top mount of claim 2, wherein said sleeve is generally barrel shaped.

4. The strut top mount of claim 3, wherein:
   said top section of said outer resilient element is disposed generally between said top bracket wall and said top tower wall; and
   said column of said outer resilient element is disposed generally between said outer bracket wall and said tower side wall.

5. The strut top mount of claim 4, wherein:
   said retention washer resilient element is disposed with respect to said tower such that said retention washer element only abuts said tower top wall when said strut top mount is substantially adjacent a predetermined maximum rebound position thereof; and
   said top section of said outer resilient element undergoes a maximum of compression between said tower and said central bracket when said strut top mount is at the predetermined maximum jounce position.

6. The strut top mount of claim 1, wherein:
   said top section of said outer resilient element is disposed generally between said top bracket wall and said top tower wall, wherein said top section reacts against said tower top wall substantially purely in compression; and
   said column of said outer resilient element is disposed generally between said outer bracket wall and said tower side wall, wherein said column acts primarily in shear to axially applied forces with an initial low load rate, and reacts in compression to radially applied forces.

7. The strut top mount of claim 6, wherein said inner resilient element further comprises a plurality of upstanding nibs, said upper end of said inner resilient element abutting said upper rate washer at said plurality of upstanding nibs.

8. The strut top mount of claim 7, wherein:
   said retention washer resilient element is disposed with respect to said tower such that said retention washer element only abuts said tower top wall when said strut top mount is substantially adjacent a predetermined maximum rebound position thereof; and
   said top section of said outer resilient element undergoes a maximum of compression between said tower and said central bracket when said strut top mount is at the predetermined maximum jounce position.

9. The strut top mount of claim 8, wherein said sleeve is generally barrel shaped.

10. An optimized strut top mount and body structure of a motor vehicle, comprising:

a strut shaft;

an annular tower having a tower side wall oriented substantially parallel to a vertical, said annular tower further having a tower top wall, wherein said tower top wall is annularly disposed between said strut shaft and said tower side wall;

an annular outer resilient element comprising a column and a top section, wherein said column adjoins said tower side wall and said top section adjoins said tower top wall;

an annular inner resilient element;

an annular central bracket having a generally U-shaped cross-section, said central bracket comprising an inner bracket wall, an outer bracket wall and a top bracket wall disposed between said inner and outer bracket walls, wherein said column of said outer resilient element is disposed generally between said outer bracket wall and said tower side wall, wherein said outer resilient element is adhered to said outer bracket wall, and wherein said inner resilient element is adhered to said inner bracket wall;

an annular bearing interconnected with said top bracket wall of said central bracket, said bearing being generally centrally disposed in substantially equidistant relation with respect to said inner bracket wall, said top bracket wall and said outer bracket wall;

a spring seat interconnected with said bearing, wherein said top bracket wall, said bearing and said spring seat are all substantially aligned with respect to each other and are all disposed within said tower;

a sleeve adhered to said inner resilient element, wherein said sleeve is in receiving relation to said strut shaft;

a lower washer affixed to said strut shaft, said lower washer abutting a lower end of said inner resilient element and a lower end of said sleeve;

an upper rate washer affixed to said strut shaft, said upper rate washer having a cup shape defining an outer washer wall that is acutely angled with respect to said strut shaft, said upper rate washer abutting an upper end of said inner resilient element and an upper end of said sleeve;

a retention washer affixed to said strut shaft substantially adjacent said upper rate washer, said retention washer having a periphery in vertical alignment with said top wall of said tower;

a plurality of upstanding nibs integrally formed of said inner resilient element, each nib of said plurality of upstanding nibs being spaced equidistantly from said strut shaft, each nib of said plurality of upstanding nibs further being discretely spaced from one another in annular relation to said strut shaft, said outer washer wall of said upper rate washer abutting said upper end of said inner resilient element at said plurality of upstanding nibs;

a retention washer resilient element adhered to said periphery of said retention washer, wherein said tower top wall is vertically aligned with respect to said retention washer resilient element so as to be abuttable therewith;

wherein said outer resilient element further comprises a plurality of ramp shaped convolutes integrally formed of said top section and said column, said ramp shaped convolutes being annularly disposed in evenly distributed relation with respect to said top section and said column, said plurality of convolutes abutting said tower top wall and said tower side wall; and wherein said plurality of convolutes rollingly abut said tower top wall;

wherein said top section reacts against said tower top wall substantially purely in compression; and wherein said column acts primarily in shear to axially applied forces with an initial low load rate, and reacts in compression to radially applied forces.

* * * * *